United States Patent [19]

Kobayashi

[11] Patent Number: 5,220,266
[45] Date of Patent: Jun. 15, 1993

[54] MOTOR SPEED CONTROLLING DEVICE CAPABLE OF CORRECTING FOR SPEED DETECTION ERROR CAUSED BY CHANGE OF DUTY RATIO OF PHOTOCOUPLER OUTPUT PULSES

[75] Inventor: Norio Kobayashi, Nagoya, Japan

[73] Assignee: Brother Kogyo Kabushiki Kaisha, Aichi, Japan

[21] Appl. No.: 900,175

[22] Filed: Jun. 17, 1992

[30] Foreign Application Priority Data

Jun. 18, 1991 [JP] Japan .................................. 3-146077

[51] Int. Cl.$^5$ .............................................. H02P 7/00
[52] U.S. Cl. .................................... 318/799; 388/902
[58] Field of Search ............... 318/254, 138, 437, 599, 318/602, 605, 616, 617, 632, 633, 640, 661, 799–812, 463, 684, 685, 612, 438, 430; 388/909, 902; 324/160, 166, 175, 177, 130

[56] References Cited

U.S. PATENT DOCUMENTS

| | | | |
|---|---|---|---|
| 4,228,396 | 10/1980 | Palombo et al. | 318/463 X |
| 4,353,016 | 10/1982 | Born | 318/254 |
| 4,539,608 | 9/1985 | Hill et al. | 318/684 X |
| 4,609,953 | 9/1986 | Mizuno et al. | 318/685 X |
| 4,694,228 | 9/1987 | Michaelis | 318/599 X |
| 4,749,927 | 6/1988 | Rodal et al. | 318/599 |
| 4,818,922 | 4/1989 | Sears et al. | 318/254 X |
| 4,833,588 | 5/1989 | Schauder | 318/807 X |
| 5,029,263 | 7/1991 | Rozman | 318/254 X |

*Primary Examiner*—Jonathan Wysocki
*Attorney, Agent, or Firm*—Kane, Dalsimer, Sullivan, Kurucz, Levy, Eisele and Richard

[57] ABSTRACT

A motor speed controlling device controls the rotational speed of a motor by feeding back an actual rotational speed detected by a photocoupler. An encoder disk formed with equi-pitch slits in the periphery thereof is attached to the drive shaft of the motor, and a photocoupler is provided in association with the encoder disk. CPU computes ON duration Ton and OFF duration Toff of pulse trains produced from the photocoupler when the motor is rotating at a constant speed. If the ON duration Ton and OFF duration Toff are unequal, ON correction factor and OFF correction factor are computed based on the measured ON and OFF durations, whereas if the ON duration and OFF duration are equal to each other, the ON and OFF correction factors are set to one (1). The CPU corrects the ON and OFF durations Ton and Toff based on the ON and OFF correction factors.

12 Claims, 5 Drawing Sheets

MOTOR SPEED CONTROLLING DEVICE CAPABLE OF CORRECTING FOR SPEED DETECTION ERROR CAUSED BY CHANGE OF DUTY RATIO OF PHOTOCOUPLER OUTPUT PULSES

BACKGROUND OF THE INVENTION

1. Field of the Invention

The present invention relates to a motor speed controlling device for controlling the rotational speed of a motor in accordance with pulse trains produced from a photocoupler attached to a motor shaft.

2. Description of the Prior Art

There has been known a motor speed controlling device to control a motor to rotate at a target speed. To this end, the rotational speed of the motor is being monitored with a photocoupler which produces pulse trains depending on the rotational speed of the motor. The photocoupler includes an encoder disk formed with a plurality of equi-pitch slits in the periphery thereof. The encoder disk is attached to the driving shaft of the motor to be rotatable therewith. Light emitting diode is disposed at one side of the encoder disk to emit light toward the periphery of the encoder disk, and a photosensor is disposed at opposite side of the encoder disk to receive the light passed through the slit of the encoder disk. The photosensor produces pulse trains whose high-level duration is determined by the rotational speed of the motor. The slits are formed in the periphery of the encoder disk so that a duty ratio of the pulse trains is set to a fixed value, typically 50%. The duty ratio is herein defined by a ratio of a high level duration to one period of the pulse trains. In the case of 50% reference duty ratio, ON and OFF durations of the pulse trains are equal to each other at the time when the motor is rotating at a constant speed. ON duration is defined by a duration from the rise time to the subsequent fall time of the pulse whereas OFF duration is defined by a duration from the fall time to the subsequent rise time of the pulse. The rotational speed of the motor can therefore be detected from either one of the ON and OFF durations of the pulse trains for the 50% reference duty ratio. Based on the detected motor speed, the motor is controlled to rotate at the target speed by feeding back a deviation between the target speed and the actual speed.

However, despite the fact that the pulse duty ratio is set to be 50%, an actual duty ratio tends to shift from the reference duty ratio. Because there are cases that the positional relationship between motor drive shaft and encoder disk or between encoder disk, light emitting diode and photosensor becomes offset due to variations of components, fabricating error between the associated components, and/or aging of the components.

Due to the various reasons set forth above, the actual duty ratio may be shifted from 50% to, for example, 55% or 45%. The shift of the duty ratio results in detection error of actual rotational speed of the motor. Specifically, when the actual duty ratio is shifted to 55% from 50%, the rotational speed of the motor computed based on the ON duration is slower than the actual rotational speed whereas the rotational speed of the motor computed based on the OFF duration is higher than the actual rotational speed. As a result, the rotational speed of the motor cannot be controlled adequately.

SUMMARY OF THE INVENTION

The present invention has been made to solve the above problem, and accordingly it is an object of the present invention to provide a motor speed controlling device capable of adequately controlling the rotational speed of the motor by way of high accuracy feed back control.

In order to achieve the above object, the present invention provides, as shown in FIG. 1, a motor speed controlling device comprising:

detecting means M2 for detecting a rotational speed of a motor M1 and producing pulse trains corresponding to the rotational speed of the motor M1, wherein when the motor M1 is rotating at a constant speed, the pulse trains has a duty ratio which may be shifted from a predetermined duty ratio;

duty ratio computing means M4 for computing a duty ratio of the pulse trains produced from the detecting means M2;

correction value computing means M5 for computing a correction value used for correcting the shift of the duty ratio to the predetermined value; and rotational speed controlling means M3 for controlling the rotational speed of the motor M1 in accordance with the pulse trains whose duty ratio is corrected by the correction value.

In the motor speed controlling device according to the present invention, the duty ratio computing means M4 computes the duty ratio of the pulse trains produced from the detecting means M2 during the constant rotation of the motor M1. The correction value computing means M5 computes the correction value which is used to make the computed duty ratio to agree with the predetermined duty ratio. The rotational speed controlling means M3 carries out feed back operation while taking the computed correction value into account, thereby controlling the rotational speed of the motor M1.

Therefore, even if the actual duty ratio of the pulse trains shifts from the predetermined duty ratio due to various mechanical reasons, the actual rotational speed of the motor is fed back to the motor, thereby assuring high accuracy control of the motor.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

Figure 1:
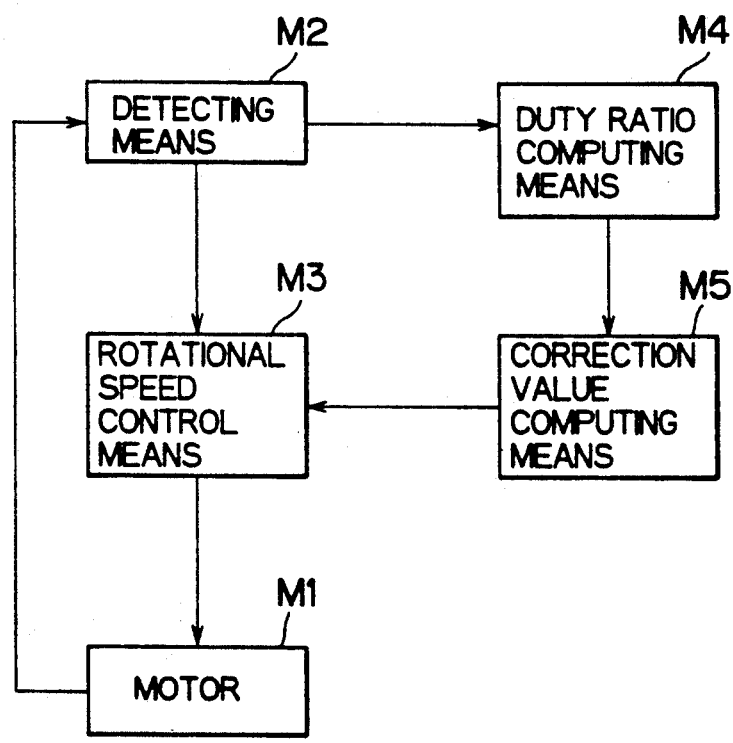
FIG. 1 is a block diagram showing a basic idea of the present invention.
Figure 2:
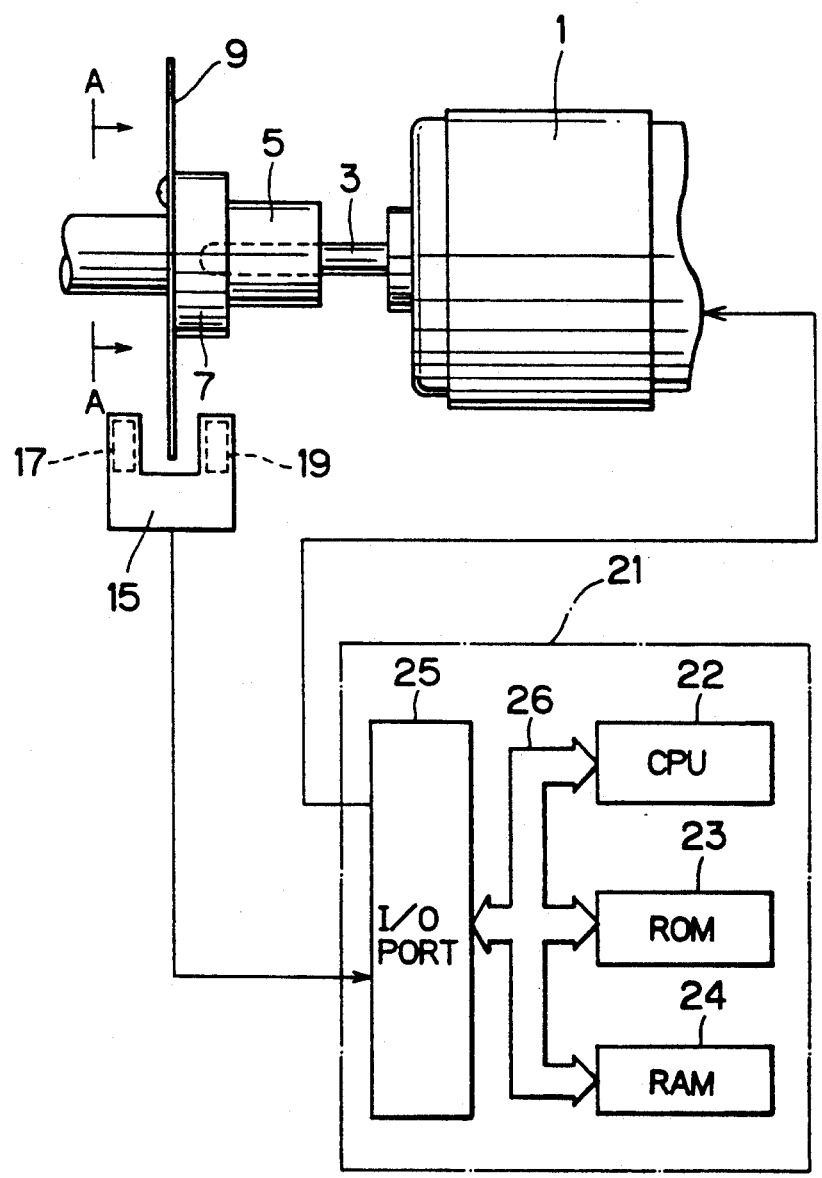
FIG. 2 shows an outline of a motor rotational speed controlling device according to an embodiment of the present invention.

FIG. 2 shows an outline of the motor speed controlling device according to the present invention. Motor 1 is fixedly secured to a frame of, for example, an electric typewriter (not shown). Shaft 5 is fixedly coupled to driving shaft 3 of motor 1. Encoder disk 9 is attached with screws to flange 7 of the shaft 5. Thus, the encoder disk 9 is coaxially rotatable together with the drive shaft 3 of the motor 1.

Figure 3:
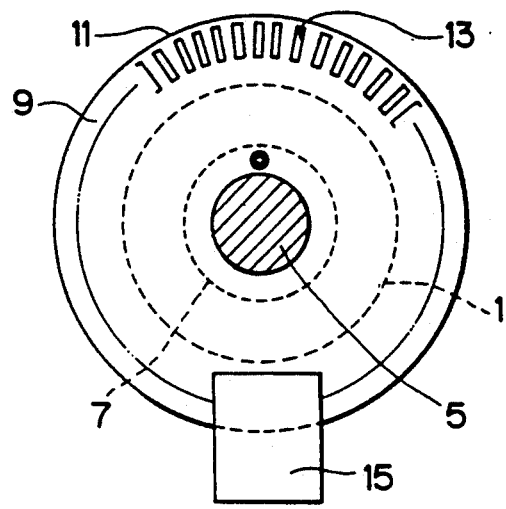
FIG. 3 is a cross-section taken along A—A line in FIG. 2.

FIG. 3 is a plan view of the encoder disk 9. As shown, the a plurality of slits 13 are formed in the periphery of the encoder disk 9 at equi-pitch. On the other hand, a photocoupler 15, serving as a detecting means M2 together with the encoder disk 9, is provided in conjunction with the encoder disk 9. The photocoupler 15 includes a light emitting diode 17 for emitting light toward the slits 13 of the encoder disk 9, and a photosensor 19 positioned at opposite side of the encoder disk 9 to receive the light passed through the slit 13. During the rotation of the encoder disk 9, the light passed through the slit 13 is intermittently received at the photosensor 19 and the photosensor 19 produces pulse trains.

The slits 13 are formed in the circumferential direction of the encoder disk 9 at equi-pitch, and the widths of the slit 13 and the non-slit portion are equal to each other. Therefore, a pulse duty ratio, which is defined by a ratio of a high level duration to a period of the pulse trains produced from the photosensor 19, is 50%. This 50% pulse duty ratio will hereinafter referred to as "reference duty ratio".

As shown in FIG. 2, an electronic control circuit 21 is constituted with a logic operation circuit including a CPU 22, ROM 23, and RAM 24, all being well known in the art. The logic operation circuit is connected through a common bus 26 to an input/output port 25 which in turn is connected to external devices such as motor 1, photocoupler 15. The CPU 22 receives the pulse trains produced from the photosensor 19 through the input/output port 25, and carries out feed back operation based on the pulse trains and data read out from the ROM 23 and RAM 24 to thereby control the rotational speed of the motor 1.

An object to be driven by the motor 1 is coupled to the shaft 5 so that the rotational power of the motor 1 is transmitted to the object. The object may be, for example, print hammer or carriage of an electronic typewriter, but any other motor driven components whose actions are regulated owing to the rotations of the motor may be coupled to the shaft 5.

Figure 4:
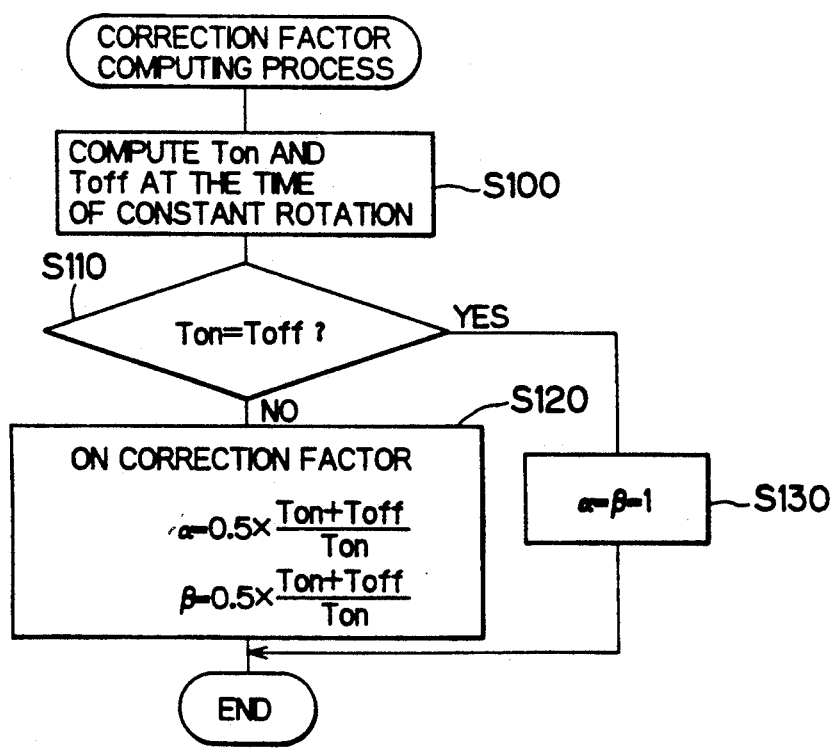
FIG. 4 is a flow chart for describing a correction factor computing process according to the embodiment of the present invention.

Correction factor computing process to be executed by the electronic control circuit 21 will be described while referring to the flow chart of FIG. 4.

Firstly, computations of ON duration Ton and OFF duration Toff are performed in accordance with pulse trains produced from the photosensor 19 when the motor 1 is rotating at a constant rotational speed (step S100). The ON duration Ton is defined by a period of time from the rise time of the pulse trains to the subsequent fall time thereof, i.e., the pulse width, whereas the OFF duration Toff is defined by a period of time from the fall time of the pulse trains to the subsequent rise time thereof.

Measurements of the ON duration Ton and OFF duration Toff are carried out when the motor 1 is rotating at a constant speed. If there is a variation in time of the ON and/or OFF durations measured, an average of the ON and OFF durations are computed for use in the subsequent processing after step S110.

Next, it is determined that the ON duration Ton and the OFF duration Toff are equal to each other (S110). Theoretically, when the motor 1 is rotating at the constant speed, the ON duration Ton and the OFF duration Toff must be equal to each other for the 50% reference duty ratio. Step S110 determines whether the ON duration Ton and the OFF duration Toff are in fact equal to each other.

If the ON duration Ton and the OFF duration Toff measured in step S100 are unequal to each other ("NO" in step S110), then a correction factor for the ON duration Ton (hereinafter referred to as "ON correction factor") $\alpha$ and a correction factor for the OFF duration Toff (hereinafter referred to as "OFF correction factor") $\beta$ are computed (S120).

Inequality of the ON duration and the OFF duration results from a positional displacement between the drive shaft 3 of the motor 1 and the shaft 5, a positional displacement between the drive shaft 3 and the encoder disk 9 15 caused by assembling error of the encoder disk 9 to the shaft 5, and a positional displacement between the encoder disk 9 and the photocoupler 15. These positional displacements yield due to dimensional variation of each component or assembling error of the associated components. Even if there is no substantial positional displacement in the associated components, an amount of light emitted from the light emitting diode 17 is liable to be reduced due to aging and thus the duration of the light detected by the photosensor 19 may become shortened.

Due to various positional displacements or aging, the actual duty ratio of the pulse trains produced from the photosensor 19 may be shifted by several percent above and below the 50% reference duty ratio. If the duty ratio is reduced to 45 %, a ratio of ON duration Ton to OFF duration Toff becomes 45:55. ON correction factor $\alpha$ and OFF correction factor $\beta$ are to regulate the ratio of ON duration Ton to OFF duration Toff to 50:50. ON correction factor $\alpha$ and OFF correction factor $\beta$ are given by the following equations (1) and (2), respectively.

$$\alpha = 0.5 \times (Ton + Toff)/Ton \quad \ldots (1)$$

$$\beta = 0.5 \times (Ton + Toff)/Toff \quad \ldots (2)$$

The thus computed ON correction factor $\alpha$ and the OFF correction factor $\beta$ are stored in RAM 24, whereupon the correction factor computing process is provisionally terminated.

On the other hand, when the ON and OFF durations Ton and Toff are equal to each other ("Yes" in step S110), both the ON and OFF correction factors $\alpha$ and $\beta$ are set to one (1) and stored in RAM 24 (S130), whereupon the processing is provisionally terminated. It should be noted that the processing in S100 corresponds to the duty ratio computing means M4, and the processing in S110 through S130 corresponds to the correction value computing means M5.

Figure 5:
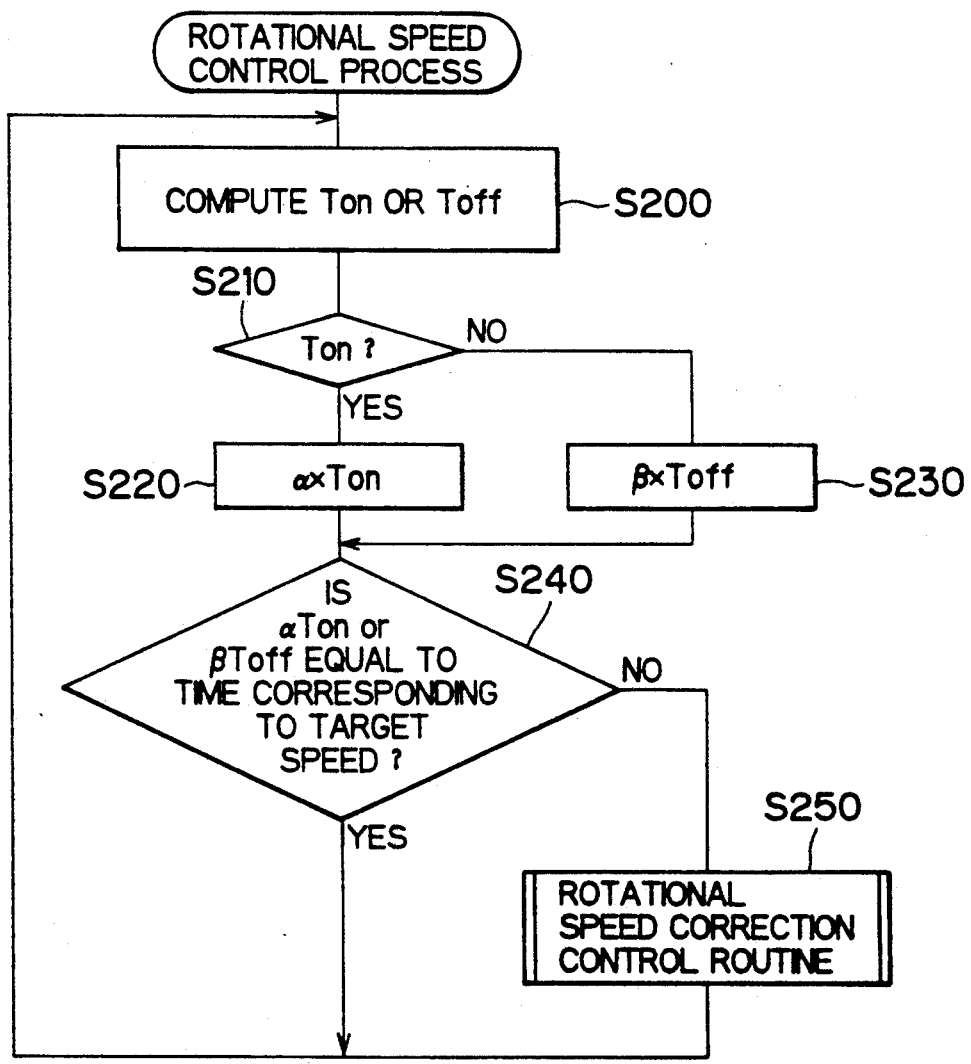
FIG. 5 is a flow chart for describing a rotational speed controlling process according to the embodiment of the present invention.

Next, referring to the flow chart of FIG. 5, description will be made with respect to rotational speed control process for controlling the rotational speed of the motor using the correction factors $\alpha$ and $\beta$.

Firstly, ON duration Ton or OFF duration Toff is computed based on the pulse trains produced from the photosensor 19 according to the rotations of the motor 1 (step S200). The computation of one of ON and OFF durations is alternately carried out in each cycle of the processing. If the ON duration Ton is computed in the first cyclic process, the OFF duration Toff is computed in the subsequent cyclic process. Then, it is determined that the computed time indicates the ON duration Ton or not (step S210). If affirmative, the ON correction factor $\alpha$ stored in RAM 24 is multiplied to the ON duration Ton (step S220). On the other hand, if the computed time indicates the OFF duration Toff ("No" in step S210), the OFF correction factor $\beta$ stored in RAM 24 is multiplied to the OFF duration Toff (step S230).

Next, it is investigated whether the corrected ON duration $\alpha$Ton ($=\alpha \times$Ton) or the corrected OFF duration $\beta$Toff ($=\beta \times$Toff) is in coincidence with the time corresponding to the target speed of the motor 1 (step S240). The corrected ON and OFF durations $\alpha$Ton and $\beta$Toff have been corrected so that $\alpha$Ton to $\beta$Toff ratio is 50:50 at the time when the motor is rotating at a constant speed through the processing in step S220 or S230. For this reason, either one of the ON duration Ton and the OFF duration Toff can be used to detect the rotational speed of the motor 1.

When the corrected ON or OFF duration $\alpha$Ton, $\beta$Toff is in coincidence with the time corresponding to the target speed of the motor 1 ("Yes" in step S240), the routine returns to step S200 without executing a rotational speed correction control routine to be described later. If the ON duration Ton was computed in step S200 in the previous cycle, then the OFF duration Toff is computed at this time. If it is determined in step S240 that the corrected ON or OFF duration $\alpha$Ton, $\beta$Toff is not in coincidence with the time corresponding to the target speed ("No" in step S240), the rotational speed correction control routine is executed (step S250). This routine implements a feedback control of the motor so that the corrected ON duration $\alpha$Ton or the corrected OFF duration $\beta$Toff computed based on the pulse trains produced from the photocoupler 15 is equal to the time corresponding to the target speed of the motor.

As described above, due to variation in size of various components, positional displacements or aging of the drive shaft 3 of the motor 1, shaft 5, encoder disk 9, photocoupler 15, the actual pulse duty ratio may be shifted from the reference duty ratio. The shift from the reference duty ratio in turn shifts the ratio of ON duration Ton to OFF duration Toff. In this embodiment, ON correction factor $\alpha$ and OFF correction factor $\beta$ are computed and the resulting correction factors $\alpha$ and $\beta$ are respectively multiplied to the ON duration Ton and OFF duration Toff both computed based on the pulse trains.

It is then determined that the corrected ON duration $\alpha$Ton or the corrected OFF duration $\beta$Toff is in coincidence with the time corresponding to the target speed of the motor 1. If "No", the motor 1 is subjected to a feedback control so that the corrected ON duration $\alpha$Ton or the corrected OFF duration $\beta$Toff is in coincidence wit the time corresponding to the target speed. In this manner, even if the actual pulse duty ratio becomes unequal to the reference duty ratio caused by various kinds of mechanical errors, the rotational speed feedback control is carried out while taking the correction value in to account to obviate the difference of the actual duty ratio. Therefore, the rotational speed of the motor can be adequately controlled with a high accuracy.

Figure 6:
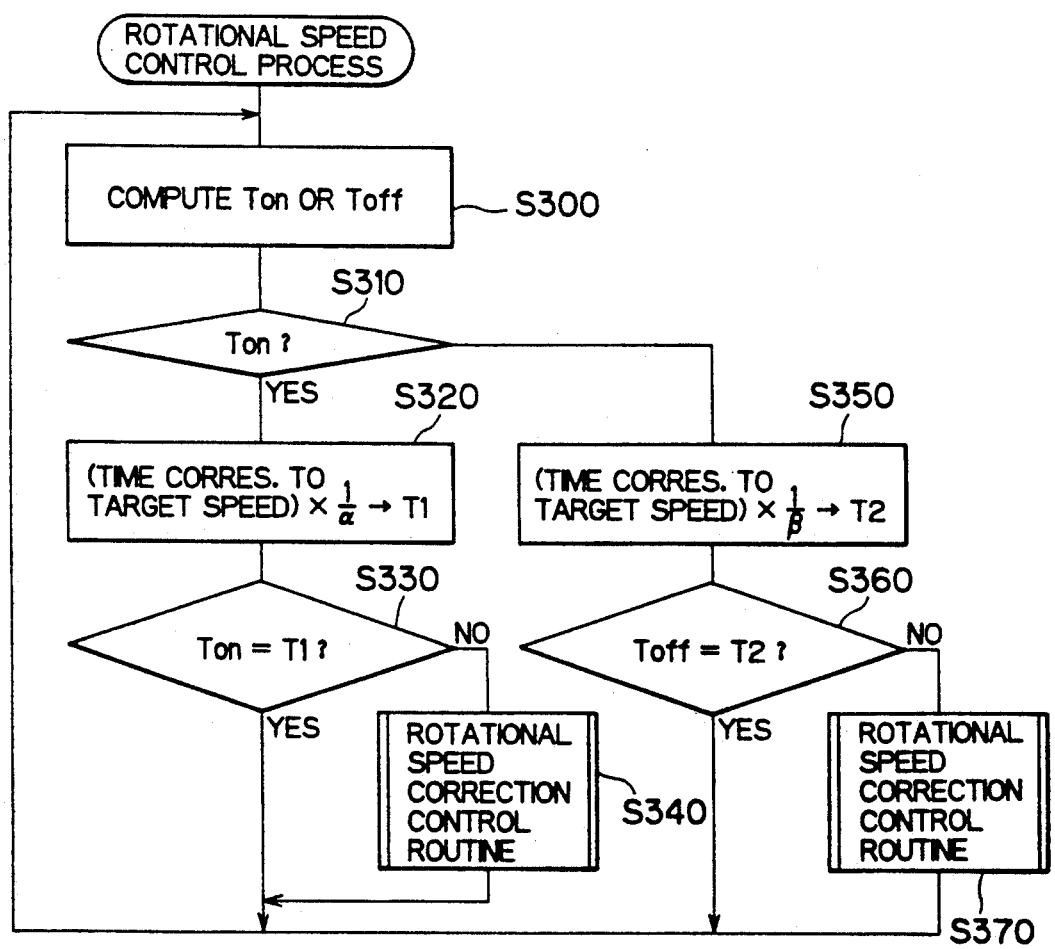
FIG. 6 is a flow chart for describing a rotational speed controlling device according to another embodiment of the present invention.

Another embodiment of the rotational speed control process will be described with reference to the flow chart of FIG. 6. In this embodiment, the target speed of the motor 1 is changed using the ON correction factor $\alpha$ and the OFF correction factor $\beta$.

Firstly, the ON duration Ton or the OFF duration Toff is computed based on the pulse trains produced in accordance with the rotations of the motor 1 (step S300). Similar to step S200 in FIG. 5, ON duration Ton and OFF duration Toff are alternately computed in each cycle of the routine. Then, it is determined in step S310 that the time thus computed corresponds to the ON duration Ton (step S310). If so (S310: Yes), a reciprocal of the ON correction factor $\alpha$ stored in RAM 24 is multiplied to the time corresponding to the target speed of the motor 1 to thereby set correction time T1 corresponding to the target speed (step S320).

Then, it is determined that the computed ON duration Ton is equal to the corrected time T1 of this ON duration Ton corresponding to the target speed (step S330). If the ON duration Ton is equal to the corrected time T1 corresponding to the target speed ("Yes" in step S330), the routine returns to step S300 without executing rotational speed correction control routine to be described later on. On the other hand, when the On duration Ton is unequal to the corrected time T1 corresponding to the target speed ("No" in step S330), the prescribed rotational speed correction control routine is executed (step S340). This routine is to carry out feedback control so that the ON duration Ton computed based on the pulse trains is equal to the corrected time T1 corresponding to the target speed for the ON duration Ton set in S320.

If the determination made in S310 indicates OFF duration Toff ("No" in step S310), the reciprocal of the OFF correction factor $\beta$ stored in RAM 24 is multiplied to the time corresponding to the target speed of the motor 1 to thereby set a corrected time T2 for the OFF duration Toff corresponding to the target speed (step S350). Then, it is determined that the computed OFF duration Toff is equal to the corrected time T2 of this OFF duration Toff corresponding to the target speed (step S360). If the OFF duration Toff is equal to the corrected time T2 corresponding to the target speed ("Yes" in step S360), the routine returns to step S300 without the executing rotational speed correction control routine.

On the other hand, when the OFF duration Toff is unequal to the corrected time T1 corresponding to the target speed ("NO" in S360), the prescribed rotational speed correction control routine is executed (step S370). This routine is to carry out a rotational speed feedback control so that the OFF duration Toff computed based on the pulse trains is equal to the corrected time T2 corresponding to the target speed for the OFF duration Toff set in step S320.

In this embodiment, the reciprocal of the ON correction factor $\alpha$ is multiplied to the time corresponding to the target speed of the motor 1 to thereby set the corrected time T1 corresponding to the target speed for the case of ON duration Ton, and the reciprocal of the OFF correction factor $\beta$ is multiplied to the time corresponding to the target speed of the motor 1 to thereby set the corrected time T2 corresponding to the target speed for the case of OFF duration Toff.

Further, it is determined that the measured ON duration Ton is equal to the corrected time T1 corresponding to the target speed or the computed OFF duration Toff is equal to the corrected time T2 corresponding to the target speed. If necessary, the rotational speed feedback control is carried out so that the ON duration Ton or OFF duration Toff is equal to the corrected times T1 and T2 corresponding to the target speed.

In the second embodiment, when the actual duty ratio of the pulse trains is shifted from the reference duty ratio, the rotational speed feedback control can be carried out while taking the corrected value into account to obviate the shift of the duty ratio. Therefore, the rotational speed control of the motor can be adequately carried out with a high accuracy feedback control.

While specific embodiments of the present invention have been described, it could be understood that the present invention is not limited to the embodiments described but a variety of modifications may be made without departing from the scope of the invention.

The motor rotational speed control device according to the present invention carried out speed feedback control while taking a correction value into account to obviate a shift of the actual duty ratio from the reference pulse duty ratio caused by various kinds of mechanical errors. Therefore, it is advantageous in that the an adequate rotational speed control of the motor can be carried out with a high accuracy feedback control.

What is claimed is:

1. A motor speed controlling device comprising:
   detecting means having an encoder disk fixedly attached to a motor shaft to be rotatable therewith, said encoder disk being formed with a plurality of equi-pitch slits in a periphery thereof, and a photocoupler provided in association with said encoder disk, said detecting means detecting a rotational speed of a motor and producing pulse trains corresponding to the rotational speed of the motor, wherein when the motor is rotating at a constant speed, the pulse trains has a duty ratio which may be shifted from a predetermined duty ratio;
   duty ratio computing means for computing a duty ratio of the pulse trains produced from said detecting means;
   correction value computing means for computing a correction value used for correcting the shift of the duty ratio to the predetermined value; and
   rotational speed controlling means for controlling the rotational speed of the motor in accordance with the pulse trains whose duty ratio is corrected by said correction value.

2. The device according to claim 1, wherein the predetermined duty ratio of the pulse trains is set to 50% wherein a high-level duration of the pulse trains occupies 50% in one period of the pulse trains.

3. The device according to claim 2, wherein said correction value computing means comprises a first computing means for computing a first correction value used for correcting the high-level duration of the pulse trains to 50% in one period of the pulse trains, and a second computing means for computing a second correction value used for correcting a low-level duration of the pulse trains to 50% in one period of the pulse trains.

4. The device according to claim 3, wherein the first and second correction values are given by the following equations:

$$\alpha = 0.5 \times (Ton + Toff)/Ton$$

$$\beta = 0.5 \times (Ton + Toff)/Toff$$

wherein $\alpha$ is the first correction value, $\beta$ is the second correction value, Ton is the high-level duration, and Toff is the low-level duration.

5. The device according to claim 4, wherein the $\alpha$ multiplied by the $T_{on}$ or the $\beta$ multiplied by the $T_{off}$ represents the actual rotational speed of the motor.

6. The device according to claim 5, wherein said rotational speed controlling means controls the rotational speed of the motor to rotate at a target speed by feeding back the actual rotational speed of the motor.

7. A motor speed controlling device comprising:
   detecting means having first means fixedly attached to a motor shaft to be rotatable therewith and second means provided in association with said first means, said second means detecting a rotational speed of a motor and producing pulse trains corresponding to the rotational speed of the motor, wherein when the motor is rotating at a constant speed, the pulse trains has a duty ratio which may be shifted from a predetermined duty ratio;
   duty ratio computing means for computing a duty ratio of the pulse trains produced from said detecting means;
   correction value computing means for computing a correction value used for correcting the shift of the duty ratio to the predetermined value; and
   rotational speed controlling means for controlling the rotational speed of the motor in accordance with the pulse trains whose duty ratio is corrected by said correction value.

8. The device according to claim 7, wherein the predetermined duty ratio of the pulse trains is set to 50% wherein a high-level duration of the pulse trains occupies 50% in one period of the pulse trains.

9. The device according to claim 8, wherein said correction value computing means comprises a first computing means for computing a first correction value used for correcting the high-level duration of the pulse trains to 50% in one period of the pulse trains, and a second computing means for computing a second correction value used for correcting a low-level duration of the pulse trains to 50% in one period of the pulse trains.

10. The device according to claim 9, wherein the first and second correction values are given by the following equations:

$$\alpha = 0.5 \times (T_{on} + T_{off})/T_{on}$$

$$\beta = 0.5 \times (T_{on} + T_{off})/T_{off}$$

wherein $\alpha$ is the first correction value, $\beta$ is the second correction value, $T_{on}$ is the high-level duration, and $T_{off}$ is the low-level duration.

11. The device according to claim 10, wherein the $\alpha$ multiplied by the $T_{on}$ or the $\beta$ multiplied by the $T_{off}$ represents the actual rotational speed of the motor.

12. The device according to claim 11, wherein said rotational speed controlling means controls the rotational speed of the motor to rotate at a target speed by feeding back the actual rotational speed of the motor.

* * * * *